United States Patent [19]

Cook

[11] 4,198,028
[45] Apr. 15, 1980

[54] DECELERATION VALVE

[75] Inventor: John E. Cook, Chatham, Canada

[73] Assignee: Canadian Fram Ltd., Chatham, Canada

[21] Appl. No.: 939,166

[22] Filed: Sep. 1, 1978

[51] Int. Cl.² ............................................ F16K 31/126
[52] U.S. Cl. ..................................... 251/48; 251/61.2;
92/100; 137/DIG. 8; 123/97 B; 123/119 D
[58] Field of Search ................. 251/48, 61, 61.2, 61.4;
92/100; 123/97 B, 117 A, 119 D; 137/DIG. 8

[56] References Cited
U.S. PATENT DOCUMENTS

| | | | |
|---|---|---|---|
| 3,377,922 | 4/1968 | Spender et al. | 92/100 X |
| 3,955,364 | 5/1976 | Lewis | 123/117 A |
| 3,982,555 | 9/1976 | Aubel et al. | 123/117 A |
| 4,052,969 | 10/1977 | Ando et al. | 251/61.4 X |
| 4,053,543 | 10/1977 | Pettitt | 123/97 B X |

Primary Examiner—Arnold Rosenthal
Attorney, Agent, or Firm—Ken C. Decker; William N. Antonis

[57] ABSTRACT

A deceleration valve for use in a vehicle emission controls system is responsive to increased engine manifold vacuum (thereby indicating a vehicle deceleration) to vent the vehicle air cleaner through the intake manifold for a controlled period of time to eliminate exhaust backfiring and to reduce hydrocarbon emissions. The valve mechanism includes a diaphragm assembly comprising an annular flexible member having an outer periphery clamped to the valve housing and an inner periphery clamped between a pair of diaphragm plates. One of the diaphragm plates has an axially projecting portion which extends through the opening in the flexible member. The other diaphragm plate has a plurality of axially extending, resilient legs which circumscribe the axially projecting portion of the first diaphragm plate and are yieldable in a radial direction so that they are able to snap into a groove on the axially projecting portion when the valve is assembled. The axially projecting portion also receives a barbed pin which connects the diaphragm assembly with the valve. A check valve is carried in the diaphragm assembly, to control communication across the assembly.

7 Claims, 3 Drawing Figures

DECELERATION VALVE

BACKGROUND OF THE INVENTION

This invention relates to a deceleration valve used in a vehicle emissions control system.

Deceleration valves are necessary in vehicle emissions control systems in order to eliminate engine backfiring and to reduce hydrocarbon emissions during vehicle declerations. These deceleration valves are responsive to an increase in engine manifold vacuum, thereby indicating a vehicle deceleration, to vent the vehicle air cleaner to the vehicle manifold vacuum. Of course, it is necessary in any valve design to provide an assembly which can be readily manufactured in substantial quantities at a relatively inexpensive cost. Accordingly, it is necessary to design a valve which, preferably, may be automatically assembled, and which has as few parts as possible.

Accordingly, the present invention proposes a valve having a valve assembly comprising an annular flexible member which is clamped between an upper and a lower diaphragm plate. The upper diaphragm plate includes a projecting portion which extends through the opening in the annular flexible member, and is provided with a groove which circumscribes the projecting portion. The lower diaphragm member includes a plurality of circumferentially spaced, axially extending, radially deflecting, resilient fingers which can be deflected radially when the valve is assembled, but snap into the groove in the projecting portion to therefor hold the two plates together when the valve is assembled. Of course, the inner periphery of the flexible member is clamped between the two plates, and the connection holds the entire assembly together. Furthermore, the projecting portion includes a coaxial aperture which receives a barbed pin, the barbs on the pin cooperating with the wall of the aperture to secure the pin to the diaphragm assembly. The pin carries a valve poppet, which is responsive to movement of the diaphragm to control communication between the air cleaner and the manifold vacuum.

SUMMARY OF THE INVENTION

Therefore, an important object of my invention is to provide a deceleration valve for a vehicle emissions control system which may be manufactured at a minimum cost, and which has a minimum number of easily manufactured parts.

Still another important object of my invention is to provide a deceleration valve having a diaphragm assembly including a unique connection between the upper and lower diaphragm plates and the flexible portion of the assembly.

Still another important object of my invention is to provide a deceleration valve having a valve diaphragm assembly which adjustably receives the pin which connects the diaphragm assembly with the valve poppet itself.

DETAILED DESCRIPTION

Figure 1:
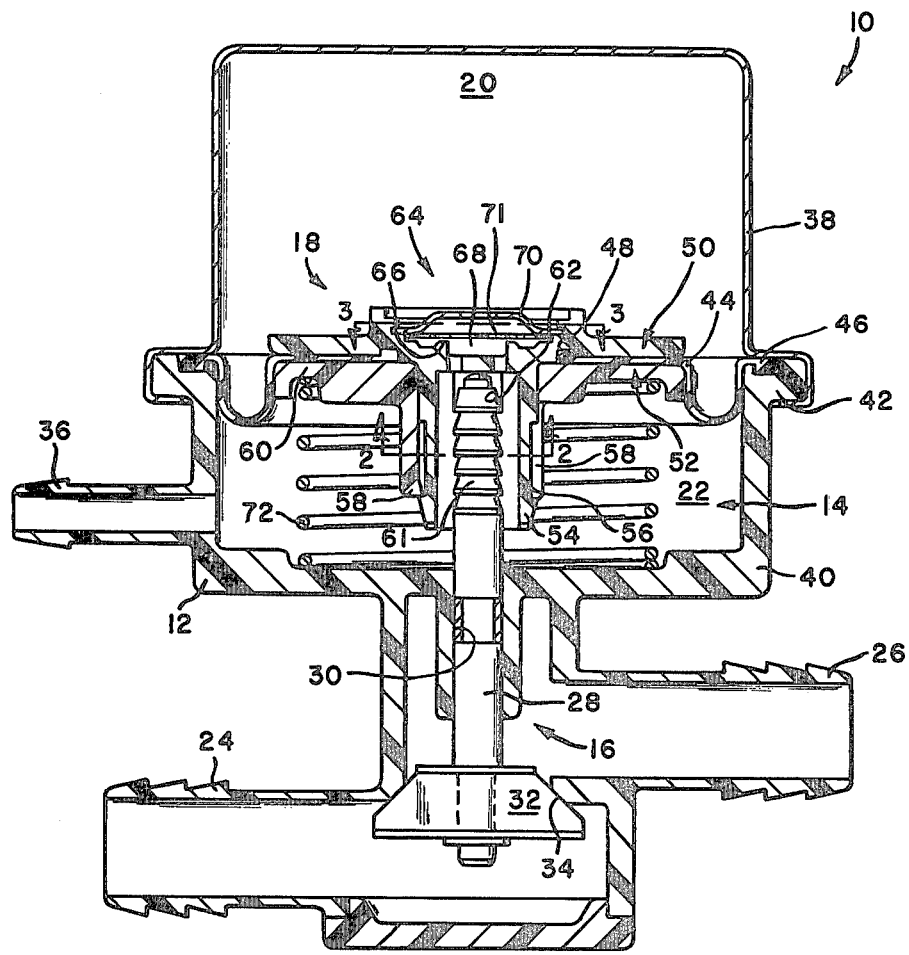
FIG. 1 is a transverse cross-sectional view of a deceleration responsive control valve made pursuant to the teachings of my present invention.
Figure 2:
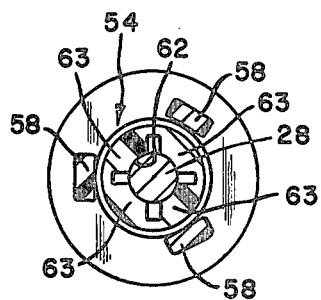
FIG. 2 is a fragmentary cross-sectional view taken substantially along lines 2—2 of FIG. 1.

Referring now to the drawings, a valve assembly generally indicated by the numeral 10 includes a housing 12 having an upper chamber 14 and a lower chamber 16. A diaphragm 18 divides the upper chamber 14 into an upper section 20 and a lower section 22. Lower chamber 16 is provided with a first port 24 which is connected to the vehicle air cleaner, and a second port 26, which is connected to manifold vacuum. A pin 28 is slidably mounted in a bore 30 defined within the housing 12. The pin 28 carries a tapered valve element 32 on the lowermost end thereof which is adapted to engage a circumferentially extending valve seat 34 defined within the housing 12 to control communication between the ports 24 and 26. A signal port 36 communicates the lower section 22 of chamber 14 with engine manifold vacuum.

The housing 12 includes portions 38, 40 which are crimped together as at juncture 42. The diaphragm assembly 18 includes an annular flexible member 44 having a beaded outer perimeter 46 which is clamped between the housing sections 38, 40 at the juncture 42. The inner periphery of the member 44 carries a circumferential bead 48 which defines a central axial opening through the member 44 and is clamped between an upper diaphragm plate 50 and a lower diaphragm plate 52. The upper diaphragm plate 50 includes a projecting portion 54 which is coaxial with the annular flexible member 44 and projects through the opening defined in the latter. A circumferentially extending groove 56 is defined on the outer circumferential surface of the projecting portion 54, and cooperates with three circumferentially spaced legs 58 carried by the lower diaphragm plate 52 to hold the diaphragm plates 50, 52 together and to clamp the bead 48 therebetween. The legs 58 project from the annular portion 60 of the lower diaphragm plate 52, and are coaxial with the projecting portion 54 and with the opening in the flexible member 44. The legs 58 are yieldably deflectable in a radial direction with respect to the projecting portion 54 and the opening in the flexible member 44 so that, when the diaphragm assembly 18 is assembled, the legs 58 deflect radially with respect to the projecting portion 54 when the diaphragm plates 50, 52 are assembled, and snap into locking engagement with the groove 56 to hold the diaphragm plates 50, 52 together. The upper end (viewing FIG. 1) of the pin 28 is provided with a plurality of circumferentially extending, axially spaced barbs 61. The projecting portion 54 divides an aperture 62 which receives the barbs 61. The aperture 62 is cut to define inwardly projecting, yieldable portions 63 spaced peripherentially around the barbs 60 and which are adapted to yieldably engage the latter to retain the pin 28 on the projecting portion 54 so that the pin 28 moves with the diaphragm assembly 28. As will be noted, the length of the pin 28 which projects from the aperture 62 can be controlled by controlling the number of barbs 60 which are disposed within the aperture 62.

Figure 3:
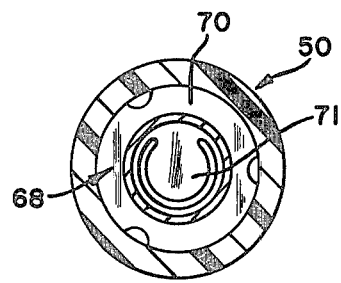
FIG. 3 is a fragmentary cross-sectional view taken substantially along lines 3—3 of FIG. 1.

The diaphragm assembly 18 further includes a check valve assembly generally indicated by the numeral 64 which controls fluid communication between the sections 20 and 22 of the upper chamber 18. Check valve assembly 64 includes an annular valve seat 66 carried on the upper diaphragm plate 50 which cooperates with a valve member 68 which is held adjacent the seat 66 by a valve retainer 70. The valve element 68 includes a flapper portion 71, as best shown in FIG. 3. The flapper portion 71 can deflect to permit controlled flow through the check valve when the valve element 68 is seated on the seat 66. Accordingly, the check valve assembly 64 permits controlled flow from the section 20 into the section 22 when the pressure level in section 20 is greater than the pressure level in section 22, thereby permitting the pressure level to equalize across the diaphragm assembly 18 in a relatively short time period of a few seconds when the valve element 68 is seated on the seat 66. However, when the pressure level in section 22 is greater than that in section 20, the valve element 68 is urged away from the seat 66 to permit substantially uninhibited fluid communication from the section 22 into the section 20. As used herein, the term "pressure level" also means vacuum levels; in other words, the flapper element 70 permits controlled flow from the section 20 into the section 22 whenever the vacuum level in the section 22 is greater than the vacuum level in the section 20. A spring 72 yieldably urges the diaphragm assembly 18 upwardly viewing FIG. 1, thereby yieldably maintaining the valve poppet 32 in sealing engagement with the valve seat 34.

In operation, the various components of the valve 10 are disposed in the positions which they assume during vehicle cruise conditions. When the vehicle is decelerated, the manifold vacuum level increases, thereby reducing the vacuum level in the section 22 of chamber 18, so that a pressure differential exists across the diaphragm assembly 18, causing the latter to move downwardly viewing the Figure. Downward movement of the diaphragm assembly 18 moves the valve poppet 32 away from the valve seat 34, thereby communicating the port 24 with the port 26. Accordingly, the air cleaner is now communicated with the vacuum level in the engine manifold. This additional air communicated to the engine manifold from the air cleaner permits the normally rich mixture that occurs at the outset of a vehicle deceleration to be burned in the engine cylinders. Therefore, hydrocarbon emissions are reduced during vehicle decelerations, and engine backfiring in the exhaust system is prevented. After a predetermined time period of a few seconds, the controlled flow permitted through the check valve assembly 64 into the section 22 of the chamber 18 equalizes the pressures across the diaphragm assembly 18, causing the spring 72 to return the diaphragm assembly 18 into the position illustrated in the drawing. Of course, when the vacuum level in the manifold increases, the increased manifold vacuum is immediately communicated across the diaphragm assembly 18 due to the fact that check valve assembly 64 permits substantially uninhibited communication from the section 22 into the section 20.

I claim:

1. In a valve assembly, a housing defining a pair of chambers therewithin, a diaphragm assembly slidably disposed within one of said chambers and dividing the latter into a pair of sections between opposite sides of said diaphragm assembly and corresponding ends of said one chamber, means for communicating a vacuum signal into one of said sections, a pin, means carried by said diaphragm assembly for securing said pin to the latter for movement therewith, said pin projecting into the other chamber, and a valve member carried in said other chamber by said pin, said other chamber having an inlet and an outlet, said valve member controlling communication between said inlet and said outlet as a function of movement of said diaphragm assembly, said diaphragm assembly including an annular flexible member having an outer perimeter secured to said housing and an inner perimeter defining a central opening in said flexible diaphragm, a pair of diaphragm plates clamping the inner perimeter of said flexible member between said diaphragm plates, one of said plates including an axially projecting portion extending through the opening, the other diaphragm plate having an annular portion circumscribing the projecting portion of the one diaphragm plate, pin retaining means carried by said projecting portion for engaging said pin to secure the pin to the diaphragm assembly and connecting means carried by said projecting portion and said annular portion for securing the diaphragm plates to one another thereby clamping said inner perimeter of said diaphragm member between said plates, said connecting means including resilient legs carried by one of said plates and a groove in the other plate, said legs engaging said slot to secure said plates to one another.

2. The invention of claim 1:
wherein said legs extend axially with respect to the opening in said flexible member, and are yieldably deflectable in a radial direction with respect to the opening in said flexible member so that said legs may engage said groove when said plates and said flexible member are assembled.

3. The invention of claim 2:
wherein said legs extend from the annular portion of said other diaphragm plate, and said groove is located on the projecting portion of said one diaphragm plate.

4. In a valve assembly, a housing defining a pair of chambers therewithin, a diaphragm assembly slidably disposed within one of said chambers and dividing the latter into a pair of sections between opposite sides of said diaphragm assembly and corresponding ends of said one chamber, means for communicating a vacuum signal into one of said sections, a pin, means carried by said diaphragm assembly for securing said pin to the latter for movement therewith, said pin projecting into the other chamber, and a valve member carried in said other chamber by said pin, said other chamber having an inlet and an outlet, said valve member controlling communication between said inlet and said outlet as a function of movement of said diaphragm assembly, said diaphragm assembly including an annular flexible member having an outer perimeter secured to said housing and an inner perimeter defining a central opening in said flexible diaphragm, a pair of diaphragm plates clamping the inner perimeter of said flexible member between said diaphragm plates, one of said plates including an axially projecting portion extending through the opening, the other diaphragm plate having an annular portion circumscribing the projecting portion of the one diaphragm plate, pin retaining means carried by said projecting portion for engaging said pin to secure the pin to the diaphragm assembly and connecting means carried by said projecting portion and said annular portion for securing the diaphragm plates to one another thereby clamping said inner perimeter of said diaphragm member between said plates, a check valve assembly carried by said one diaphragm plate permitting controlled communication between said sections, said check valve assembly including a valve seat integral with said one diaphragm plate, a valve member for engagement with said valve seat and a valve retainer carried by said one diaphragm plate retaining said valve member on said one diaphragm plate, said valve member including a deflectable member permitting controlled flow at a limited rate from the other section into said one section when the check valve is disposed on said seat when the pressure level in said one section is less than the pressure level in the other section, said valve means moving away from said seat to permit uninhibited communication from said one section into the other section when the pressure level in the one section exceeds the pressure level in the other section.

5. In a valve assembly, a housing defining a pair of chambers therewithin, a diaphragm assembly slidably disposed within one of said chambers and dividing the latter into a pair of sections between opposite sides of said diaphragm assembly and corresponding ends of said one chamber, means for communicating a vacuum signal into one of said sections, a pin, means carried by said diaphragm assembly for securing said pin to the latter for movement therewith, said pin projecting into the other chamber, and a valve member carried in said other chamber by said pin, said other chamber having an inlet and an outlet, said valve member controlling communication between said inlet and said outlet as a function of movement of said diaphragm assembly, said diaphragm assembly including an annular flexible member having an outer perimeter secured to said housing and an inner perimeter defining a central opening in said flexible diaphragm, a pair of diaphragm plates clamping the inner perimeter of said flexible member between said diaphragm plates, one of said plates including an axially projecting portion extending through the opening, the other diaphragm plate having an annular portion circumscribing the projecting portion of the one diaphragm plate, pin retaining means carried by said projecting portion for engaging said pin to secure the pin to the diaphragm assembly and connecting means carried by said projecting portion and said annular portion for securing the diaphragm plates to one another thereby clamping said inner perimeter of said diaphragm member between said plates, said means securing said pin for movement with the diaphragm assembly including circumferentially extending barbs on said pin, and an aperture in said diaphragm assembly receiving said barbs with an interference fit to thereby secure the pin to the diaphragm assembly.

6. The invention of claim 5:
wherein said aperture is in said projecting portion of said one diaphragm plate and is coaxial with said opening in said flexible member.

7. The invention of claim 6:
wherein said projecting portion includes means projecting into said aperture for engagement with said barbs.

* * * * *